United States Patent
Peters et al.

(10) Patent No.: US 7,083,319 B2
(45) Date of Patent: Aug. 1, 2006

(54) LARGE-VOLUME REACTOR HAVING A PLURALITY OF PROCESS SPACES

(75) Inventors: Hans Peters, Weil (DE); Rainer Näf, Dietikon (CH)

(73) Assignee: Buss SMS GmbH Verfahrenstechnic, Butzbach (DE)

( * ) Notice: Subject to any disclaimer, the term of this patent is extended or adjusted under 35 U.S.C. 154(b) by 251 days.

(21) Appl. No.: 10/738,677

(22) Filed: Dec. 17, 2003

(65) Prior Publication Data

US 2004/0228204 A1    Nov. 18, 2004

(30) Foreign Application Priority Data

May 15, 2003    (CH) .............................. 2003 0864/03

(51) Int. Cl.
B29B 7/48      (2006.01)
B29B 7/84      (2006.01)

(52) U.S. Cl. ............................ 366/75; 366/91; 366/97; 366/290

(58) Field of Classification Search ............ 366/14–15, 366/66, 75, 80, 82, 91, 96–99, 186, 290, 366/292, 302, 307, 318; 422/225–226, 228, 422/135; 425/203, 204, 208, 209
See application file for complete search history.

(56) References Cited

U.S. PATENT DOCUMENTS

| | | | |
|---|---|---|---|
| 2,078,565 A * | 4/1937 | Durst et al. ................... 366/75 |
| 3,057,702 A | 10/1962 | Pierce et al. | |
| 3,506,201 A | 4/1970 | Engels et al. | |
| 3,832,431 A * | 8/1974 | Matthaei ....................... 264/75 |
| 4,127,372 A * | 11/1978 | Perla et al. .................. 425/205 |
| 4,431,311 A * | 2/1984 | Kolossow ..................... 425/208 |
| 4,730,935 A * | 3/1988 | Kolossow ..................... 366/82 |
| 4,746,478 A * | 5/1988 | Fujisaki et al. ............. 366/292 |
| 5,007,590 A | 4/1991 | Taylor | |

(Continued)

FOREIGN PATENT DOCUMENTS

EP    0 460 466 A1    12/1991

(Continued)

OTHER PUBLICATIONS

*Polymer Devolatilization*, Albalak, pp. 460-463.
*Entgasen von Kunststoffen*, VDI-Verlag, pp. 116-135.

*Primary Examiner*—Charles E. Cooley
(74) *Attorney, Agent, or Firm*—Alston & Bird LLP

(57) ABSTRACT

A large-volume reactor (10) for treating a free-flowing material, having a housing (12) which surrounds an interior space (14), a material feed (11) at one end of the housing (12) and a material discharge (13) at the other end of the housing (12). A rotor shaft (22), which is driven in rotation about its axis and conveys the material in the direction from the material feed (11) to the material discharge (13), is arranged in the interior space (14). A partition wall (16) in the interior space (14) defines two separate process spaces (18', 18") from one another, and the partition wall (16) includes a build-up system (24) having a build-up system passage (26) which leads from an inlet opening (40) which opens out into the first process space (18'), to an outlet opening (42) which opens out into the second process space (18"). The build-up system passage (26) is configured to pass the material from the first process space (18') into the second process space (18") and so that the flowing material forms a barrier which effectively prevents gas from passing through the passage.

21 Claims, 14 Drawing Sheets

U.S. PATENT DOCUMENTS

| | | | |
|---|---|---|---|
| 5,419,634 A * | 5/1995 | Bacher et al. | 366/75 |
| 6,066,708 A | 5/2000 | Nash et al. | |
| 6,150,498 A | 11/2000 | Abel, Jr. et al. | |
| 6,299,342 B1 * | 10/2001 | Eggen et al. | 366/91 |
| 6,432,341 B1 * | 8/2002 | Yamaguchi et al. | 264/177.1 |

FOREIGN PATENT DOCUMENTS

| | | |
|---|---|---|
| EP | 0 528 210 A1 | 2/1993 |
| EP | 0 638 354 A1 | 2/1995 |
| EP | 0 715 881 A2 | 6/1996 |
| EP | 0 715 882 A2 | 6/1996 |
| EP | 0 768 155 A1 | 4/1997 |
| EP | 0 798 093 A2 | 10/1997 |
| EP | 0 917 941 A2 | 5/1999 |
| EP | 0 930 141 A1 | 7/1999 |
| EP | 1 000 657 A2 | 5/2000 |
| EP | 1 101 525 A1 | 5/2001 |
| JP | 60 090032 A | 5/1985 |
| JP | 61-241117 * | 10/1986 |

* cited by examiner

LARGE-VOLUME REACTOR HAVING A PLURALITY OF PROCESS SPACES

BACKGROUND OF THE INVENTION

The present invention relates to a large-volume reactor of the type used for polymer production, specifically for mixing, reacting, degassing, and devolatilization of viscous solutions and melts, and free flowing materials.

Such large-volume reactors are commonly used in particular in the production and processing of polymers and plastics, and they usually have an interior space with a minimum volume of approximately 3 to 50,000 liters and a normal volume of approximately 1,000 to 20,000 liters. They are designed to ensure good mixing and kneading action over a broad viscosity range and therefore rapid renewal of the free surface.

A large-volume reactor of this type is disclosed, for example, in EP-A-1101525. EP-A-1101525 relates to a reactor with two shafts which are arranged parallel to one another and bear a number of rotating elements which extend as close as possible to the inner wall of the housing and to the shank of the opposite shaft and intermesh with one another.

Further large-volume reactors are described in EP-B-460466, EP-B-528210, EP-B-638354, EP-B-715881, EP-B-715882, EP-B-798093, EP-B-917941, EP-B-930141 and EP-A-1000657. A common feature of the known large-volume reactors is that they have an interior space surrounded by a housing, and therefore the material which is to be processed in the reactor is under the same pressure.

Many processes, such as for example concentration, degassing, devolatilization drying or polymerization processes, are very crucially dependent on the pressure in the process space. In processes of this type, it is advantageous to match the pressure to the physical and/or chemical materials properties in the process space, which change as the process continues.

By way of example, when devolatilizing material it is advantageous to devolatilize the volatile components (known as vapors) at more than one pressure, since the devolatilization at a single pressure would cause the entire quantity of vapors to be produced in a single stage, and this quantity could only be extracted and condensed by means of expensive vacuum installations and condensation systems.

Moreover, the high vapor velocity associated with the devolatilization at a single pressure would cause a relatively high proportion of the material to be entrained during separation of the vapors, which could cause considerable foaming in the material which is to be devolatilized and this would additionally have an adverse effect on the devolatilization process and could lead to undesirable deposits at the vapor outlet.

For processes carried out using known reactors, a plurality of pressures are established by virtue of the fact that a plurality of process spaces surrounded by separate housings—i.e. a plurality of small-space and/or large-space reactors—in which the appropriate pressure is present are arranged in succession and are connected to one another by means of pipelines.

EP-B 0768155 describes a process for producing polymer granules from a polymer solution in two individual reactors, in which the polymer solution is heated in a dwell tube or heat exchanger, which forms a first reactor, to a given temperature under a pressure of 1 to 15 bar, and the concentrated polymer solution is concentrated further at a given temperature and a pressure of 1 mbar to 5 bar in a drying apparatus which acts as a second large-volume reactor. Said drying apparatus comprises a material feed at one end of the housing and a material discharge at the other end of the housing, two rotor shafts, which convey the material in the direction from the material feed to the material discharge, being arranged in the interior space.

Reactor systems of this type have the drawback that, on account of their complex design, it is difficult to achieve operationally reliable passage of the material from one process space to another without harming the product. This is the case in particular if high-viscosity material is being conveyed, if high temperatures have to be set or if short residence times for the transfer are desired. In addition, said reactor systems take up an extremely large amount of space, since each individual pressure is assigned a process space surrounded by a separate housing. Therefore, reactor systems of this type entail high procurement, installation and maintenance costs.

The present invention is based on the object of providing a large-volume reactor having an interior space which is surrounded by a housing and in which different pressures can be established simultaneously.

SUMMARY OF THE INVENTION

According to the invention, a partition wall separates the interior of the reactor into two process spaces, which are each assigned to one pressure, which may differ from one another. Further partition walls, which separate further process spaces and therefore pressures from one another, may be present.

The material which is to be treated is conveyed in the direction from a material feed at one end of the housing to a material discharge at the other end of the housing by means of a rotor shaft which is arranged in the interior space and is driven in rotation about its axis. The material to be treated is passed from the first process space into the second process space through a build-up system which is associated with the partition wall and comprises a build-up system passage which leads from an inlet opening which opens out into the first process space, to an outlet opening which opens out into the second process space.

When carrying out a process in the large-volume reactor according to the invention, the product filling level in the first process space is selected in such a manner that, in steady-state mode, the entire free cross section of the inlet opening is covered with material, producing an effective barrier between the two process spaces. In this case, the material is passed through the build-up system passage from the first process space into the second process space, and at the same time gas is essentially prevented from passing through. This allows different pressures to be set simultaneously in the interior space of the large-volume reactor.

A large-volume reactor according to the invention takes up very little space. Its design ensures that the material which is to be treated can be passed from a first process space into a second process space in a simple, operationally reliable manner. These advantages mean that a large-volume reactor according to the invention can be produced and maintained at low cost.

In a preferred embodiment, the build-up system comprises an active conveyor for conveying the material through the build-up system passage. This allows the material to be conveyed continuously, in a controlled manner, from the inlet opening to the discharge opening of the build-up system passage.

In a further preferred embodiment, the active conveyor is a screw conveyor, particularly preferably a tightly meshing twin-screw conveyor. In an embodiment of this type, it is possible to virtually completely prevent axial back-mixing between two successive process spaces. This is advantageous, for example, if an additional component which is added in the build-up system or in the second process space, such as for example a catalyst, a stopper, a neutralizer, a regulator or an additive, is not to come into contact with the composition of the material in the first process space.

In a further preferred embodiment, the active conveyor is driven in such a manner that its rotational speed can be varied. This means that during operation the mean material filling levels and material residence times in the process spaces can be varied and matched to the optimum process conditions.

In a further preferred embodiment, the build-up system is arranged in the interior of the partition wall, the build-up system lying in a plane which is at least approximately at right angles to the longitudinal axis of the rotor shaft, and the inlet opening being arranged adjacent to the base of the first process space and the outlet opening being arranged at a higher level with respect to the inlet opening. This allows a simple and space-saving design of the build-up system and in addition ensures that, even with relatively low material filling levels in the first process space, the free cross section of the inlet opening is permanently covered with material during operation, and in this way gas is prevented from passing through.

In a further preferred embodiment, the rotor shaft passes through the partition wall, is mounted in sealed fashion at the partition wall and is active in the two process spaces. The result of this is that the rotor shaft performs its action both in the first process space and in the second process space by means of a single drive system. In addition, in a further preferred embodiment, two parallel rotor shafts are arranged in at least one of the two process spaces. These rotor shafts rotate in the same direction or in opposite directions and have disc elements which intermesh with one another. This makes it possible to achieve a similar mixing and kneading action to that described in EP-A-1101525 in at least one process space of the large-volume reactor according to the invention as well. In a further preferred embodiment, two parallel rotor shafts pass through the partition wall, are mounted in sealing fashion at the partition wall and are active in the two process spaces, allowing the said mixing and kneading action to be achieved in both process spaces with the aid of a single drive system.

In a further preferred embodiment, a first rotor shaft is arranged in the first process space and mounted at the partition wall, and a second rotor shaft is arranged in the second process space and mounted at the partition wall. An embodiment of this type is particularly advantageous if the rotor shafts in the two process spaces are to be driven at different rotational speeds. In this context, it is particularly preferable for two parallel rotor shafts to be arranged at least in one process space and mounted at the partition wall, allowing a mixing and kneading action as described above to be achieved in this process space.

If, in a further preferred embodiment, the build-up system is heated, the temperature in the build-up system can be optimally matched to the process conditions.

If, as in a further preferred embodiment, a partial-stream passage for removal of material leads away from the build-up system passage, this allows the safe removal of samples from the upstream process stage without leaving any dead spaces, which is otherwise difficult to achieve. This is often an important condition for setting the optimum process conditions in the individual process spaces. The specimen can be conveyed periodically or continuously via a measuring or analysis unit in which, for example, the viscosity, the color or the infrared residual content is determined, and can then be passed back into the large-volume reactor or disposed of. This embodiment is advantageous in particular if the start-up operations are complex or if the start-up material is not to be passed through the entire large-volume reactor.

In a further preferred embodiment, a feed passage for supplying a substance leads into the build-up system passage. This allows components which are present in the entire second process space but are not to come into contact with the material composition in the first process space to be fed in targeted fashion into the large-volume reactor.

In a further preferred embodiment, the partition wall is assigned a vapor discharge system having a vapor passage, the vapor passage comprising a vapor inlet opening, which opens out into the first process space, in the partition wall and a vapor outlet opening, which is connected to the vapor condensation system, and the vapor passage being intended to pass vapors from the first process space to the vapor condensation system. This has the advantage that, in the case of degassing operations, the volatile components can be extracted by means of backward devolatilization. In this case, entrained material can be returned into the first process space by means of an active conveyor in the vapor passage.

In a further preferred embodiment, the first process space has a larger volume than the second process space. This is particularly advantageous in the case of flash evaporation or in the case of concentration of material with a high initial solvent content, since this embodiment allows relatively large quantities of vapors to be extracted with a reduced loss of flow pressure and reduced entrainment of vapors.

In a further embodiment, at least one process space has a vapor inlet opening in the lateral wall of the housing. Therefore, in the case of devolatilization operations, vapors can be extracted from this process space; it is possible to select a vapor condensation system which is optimally matched to the corresponding quantity of vapors and to the vapor composition.

In a further preferred embodiment, the surface of the partition wall is of planar design and is arranged perpendicular to the axis of the rotor shaft. The rotor shaft has a cleaning element which interacts with the partition wall for cleaning purposes. This allows the partition wall to be almost completely cleaned by the rotor shaft.

A reactor according to the invention can be used for thermal and/or physical and/or chemical treatments of materials systems. A thermal treatment is understood as meaning in particular the evaporation, devolatilization and drying of a materials system. The term physical treatment encompasses in particular transformation, sublimation, resublimation, crystallization or mixing of a materials system, while the term chemical treatment generally comprises reactions.

A large-volume reactor according to the invention is preferably used for the devolatilization of materials systems and for the production and compounding of polymers.

By way of example, a single large-volume reactor according to the invention can be used to carry out a process as described in U.S. Pat. No. 6,066,708.

BRIEF DESCRIPTION OF THE DRAWINGS

Large-volume reactors according to the invention are explained in detail by means of the drawings described below, in which, purely diagrammatically.

DETAILED DESCRIPTION OF THE PREFERRED EMBODIMENTS

Figure 1:
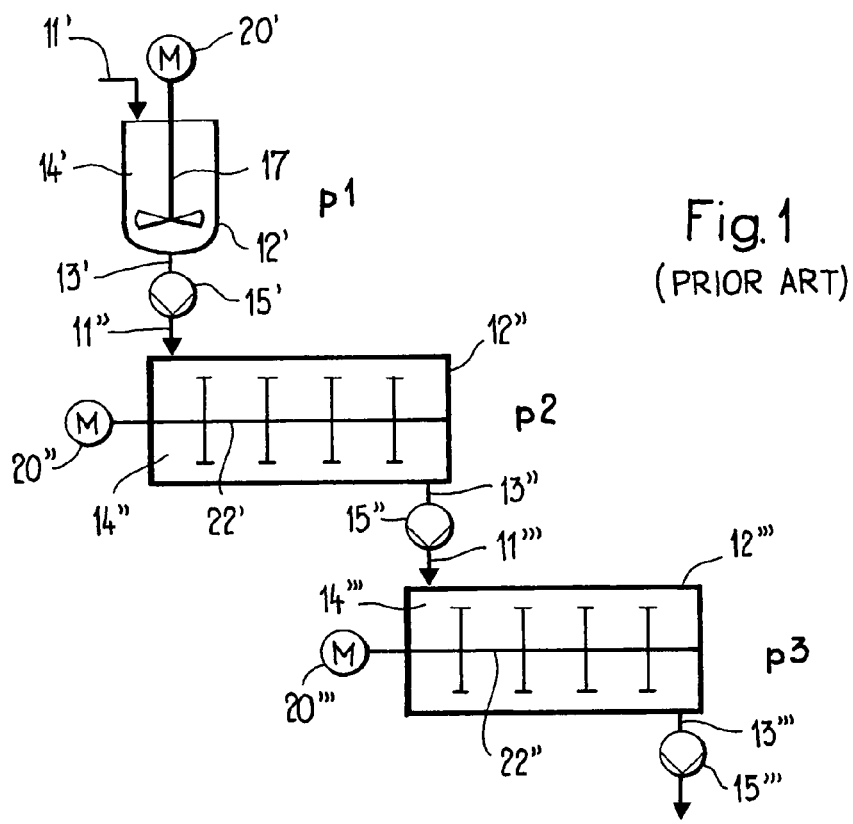
FIG. 1 shows the arrangement of a reactor system with three reactors with their own pressure surrounded by separate housings; this arrangement belongs to the prior art.

FIG. 1 shows an arrangement, which belongs to the prior art and has been disclosed in EP-B-768155 and corresponding U.S. Pat. No. 5,684,087, of a reactor system having three interior spaces 14', 14", 14''' which are surrounded by separate housings 12', 12", 12''', each form a process space and have their own pressure p1, p2, p3. Each interior space 14', 14", 14''' has a material feed 11', 11", 11''' and a material discharge 13', 13", 13'''. The material is conveyed from the first interior space 14' into the second interior space 14" and from the second interior space 14" into the third interior space 14''' and from the third interior space 14''' to the outside by means of pumps 15', 15", 15'''. The pressures assigned to the interior spaces 14', 14", 14''' are separated off by means of the respective connecting lines together with the pumps 15', 15" arranged therein.

A stirrer 17, which is driven by its own drive system 20', is arranged in the first interior space 14'. A rotor shaft 22', 22", which is in each case driven by its own drive system 20", 20''' and which is intended to convey the material from the respective material feed 11", 11''' to the respective material discharge 13", 13''', is arranged with a horizontal axis in the second interior space and in the third interior space, respectively.

Figure 2:
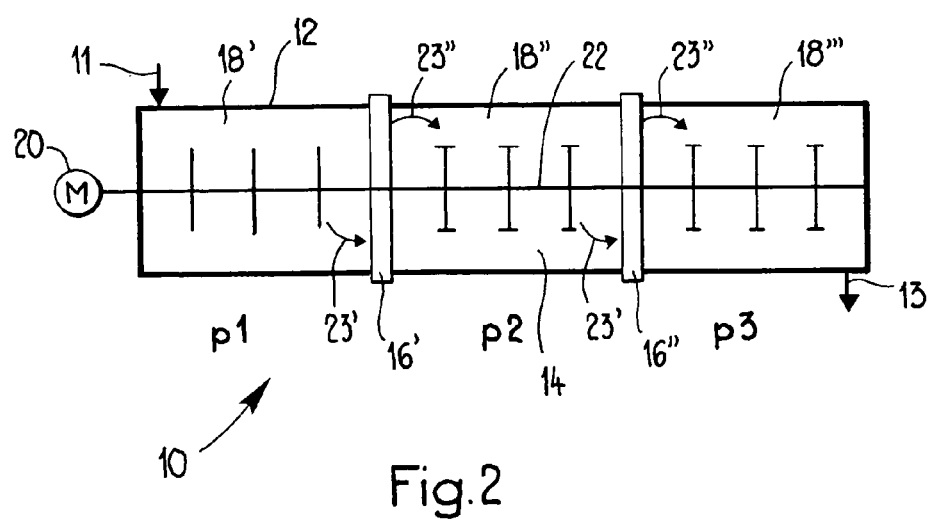
FIG. 2 shows a large-volume reactor according to the invention, having an interior space which is surrounded by a housing and has three process spaces in which different pressures are present.

By contrast, the large-volume reactor 10 according to the invention shown in FIG. 2 has one interior space 14 which is surrounded by a single housing 12 and in which two partition walls 16', 16" define a total of three process spaces 18', 18", 18''' with their own pressures p1, p2, p3 which are separated from one another. At one end, the large-volume reactor 10 has a material feed 11, and at the other end it has a material discharge 13.

A rotor shaft 22, which is driven by a drive system 20, passes through the partition walls 16', 16" and conveys the material which is to be treated in the direction from the material feed 11 to the material discharge 13 through the entire interior space 14. The shaft 22 is arranged to have a horizontal axis in the interior space 14. The partition walls 16', 16" are each assigned a build-up system with a build-up system passage, which is described in detail below but here is indicated only by arrows 23', 23". The arrows 23', 23" indicate that the material passes via an inlet opening, which is arranged adjacent to the base of the first process space 18' or second process space 18", into the build-up system passage and upward from the latter, via an outlet opening which lies at a higher level than the inlet opening, into the second process space 18" or third process space 18'''.

Figure 3:
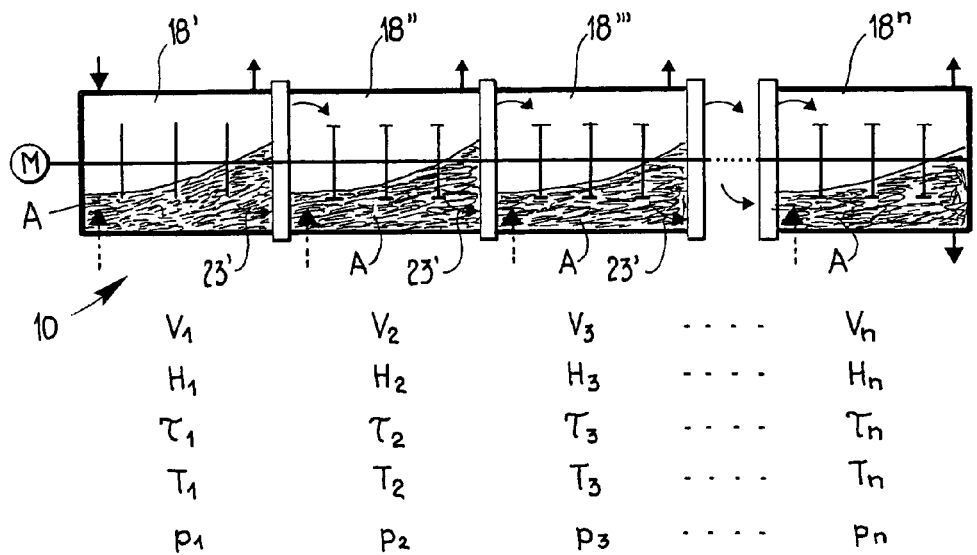
FIG. 3 shows a large-volume reactor according to the invention, having an interior space which is surrounded by a housing and has a plurality of process spaces which contain material and in which different volumes, filling levels, mean residence times, temperatures and pressures are present.

In a similar way, FIG. 3 shows a large-volume reactor 10 with n process spaces 18', 18", 18''', . . . 18$^n$ having different volumes (V), filling levels (H), mean residence times (τ), temperatures (T) and pressures (p), although the build-up systems which connect the process spaces to one another are not shown, for the sake of clarity. The figure does diagrammatically indicate that the material A which is to be treated in the individual process spaces 18', 18", 18''', during the procedure, covers the inlet openings of the build-up system passages indicated by arrow 23'.

Figure 4:
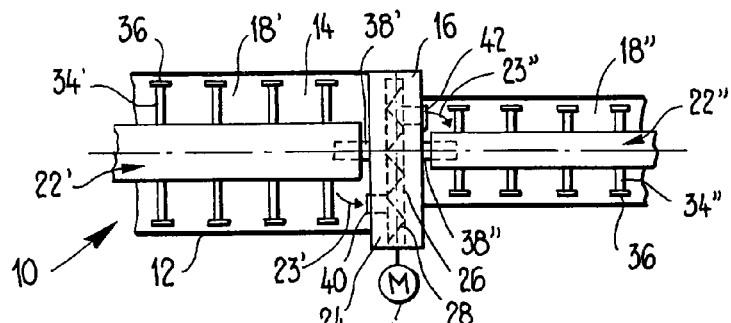
FIG. 4 shows a vertical longitudinal section through a part of a large-volume reactor according to the invention.
Figure 5:
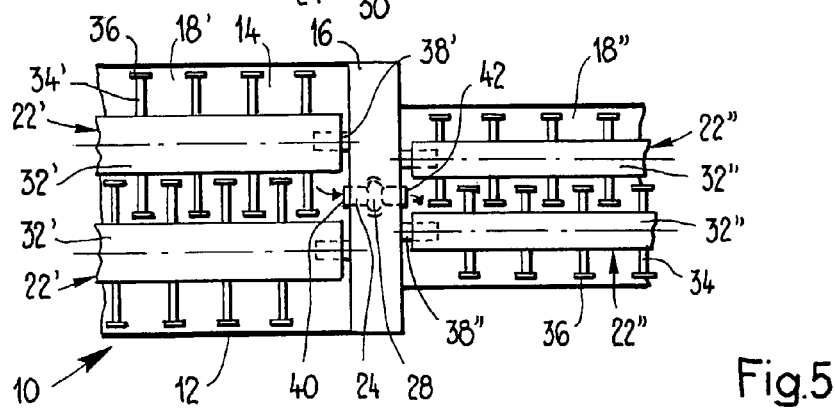
FIG. 5 shows a horizontal longitudinal section through the part of the large-volume reactor which is shown in FIG. 4.

FIG. 4 shows a vertical longitudinal section and FIG. 5 a horizontal longitudinal section through part of a large-volume reactor 10 according to the invention. The housing 12 which is partially illustrated comprises an interior space 14, in which a first and a second process space 18', 18" are separated by means of a partition wall 16. The cross-sectional area of the first process space 18' is larger than that of the second process space 18".

As can be seen in particular from FIG. 4, a build-up system 24 having a build-up system passage 26 running in the vertical direction is arranged in the partition wall 16. An inlet opening 40 of the partition wall 16 leads horizontally from the lower region of the first process space 18' into the build-up system passage 26. An outlet opening 42 in the partition wall 16 leads horizontally out of the build-up system passage 26 into the upper region of the second process space 18".

A tightly meshing twin-screw conveyor 28 is arranged in the build-up system passage 26 and is driven by a twin-screw conveyor drive system 30 arranged beneath the housing 12 and, as indicated by arrows 23', 23", conveys the material out of the first process space 18' into the second process space 18". The screw shafts are driven in rotation in opposite directions to one another or in the same direction by means of the twin-screw conveyor drive system 30.

As can be seen from FIG. 5, in each case two parallel rotor shafts 22', 22" are arranged horizontally in the first and second process spaces 18', 18" and are mounted at the partition wall. The rotor shafts 22', 22" comprise a shank 32', 32" with disc elements 34', 34" which are arranged thereon and extend as close as possible to the wall of the housing 12 and to the shank 32', 32" of the opposite rotor shaft 22', 22" and intermesh with one another. Cleaning elements 36, which are oriented substantially parallel to the wall of the housing, extend as close as possible to the wall of the housing 12 and cause the latter to be continuously cleaned during operation, are arranged at the free end of the disc elements 34', 34". It is conceivable for other elements, such as hooks, bars, blades, etc. to be arranged on the rotor shafts instead of disc elements in all the large-volume reactors according to the invention.

Furthermore, the rotor shafts 22', 22" may have cleaning elements (not shown for the sake of clarity) for cleaning the planar surface of the partition wall 16, these elements extending as close as possible to the partition wall 16. The distance between the rotor shafts 22' in the first process space 18' is greater than the distance between the rotor shafts 22" in the second process space 18". The distance between the shank 32' and the free ends of the disc elements 34' and also the shank diameter of the rotor shafts 22' are greater in the first process space 18' than the corresponding measurements of the rotor shafts 22" in the second process space 18". The rotor shafts 22', 22" are each mounted at the partition wall 16 by means of a cylindrical journal 38', 38". The rotor shafts 22' in the first process space 18' and the rotor shafts 22' in the second process space 18' are each driven separately by a drive system, which is not shown for the sake of clarity.

Figure 6:
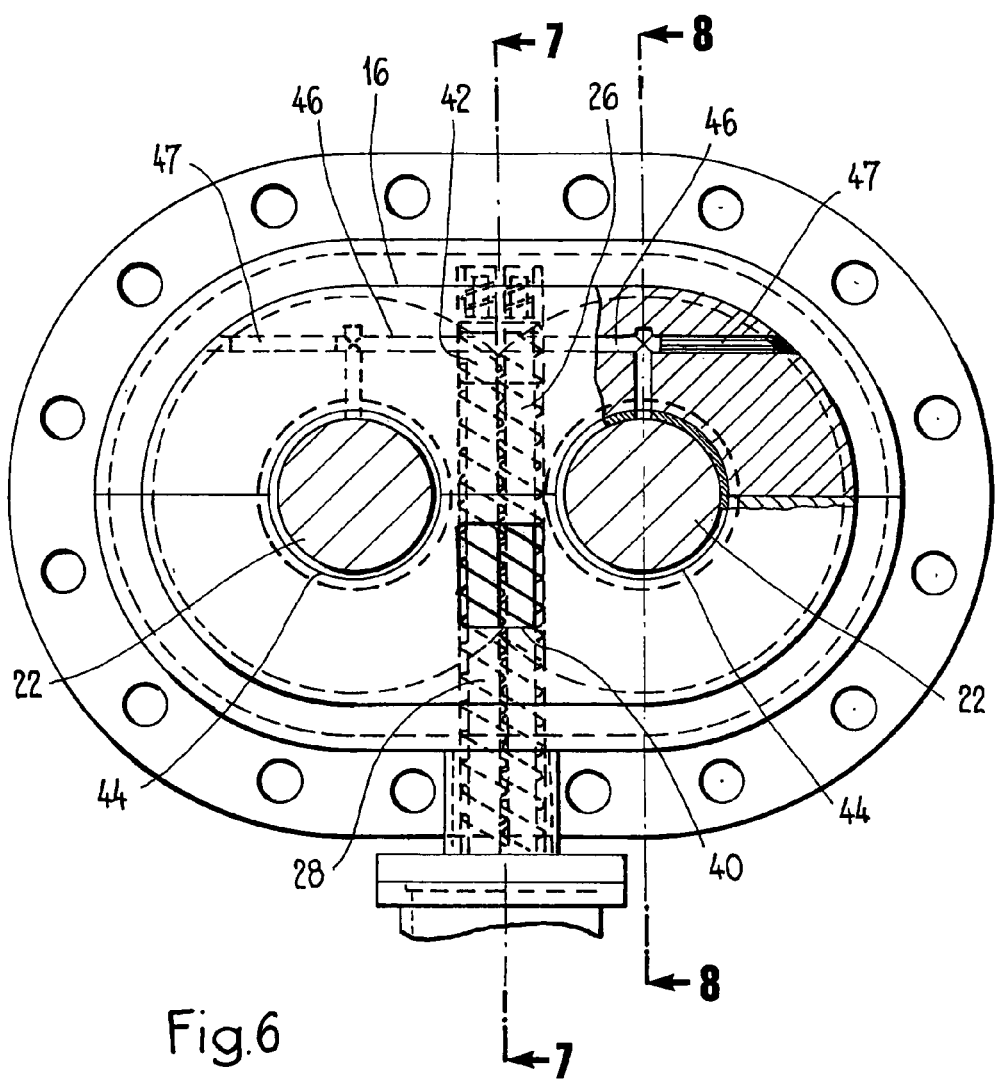
FIG. 6 shows a radial section through the partition wall of a large-volume reactor according to the invention, having the build-up system and two lead-throughs, through which two rotor shafts pass through the partition wall and are mounted at the partition wall.
Figure 7:
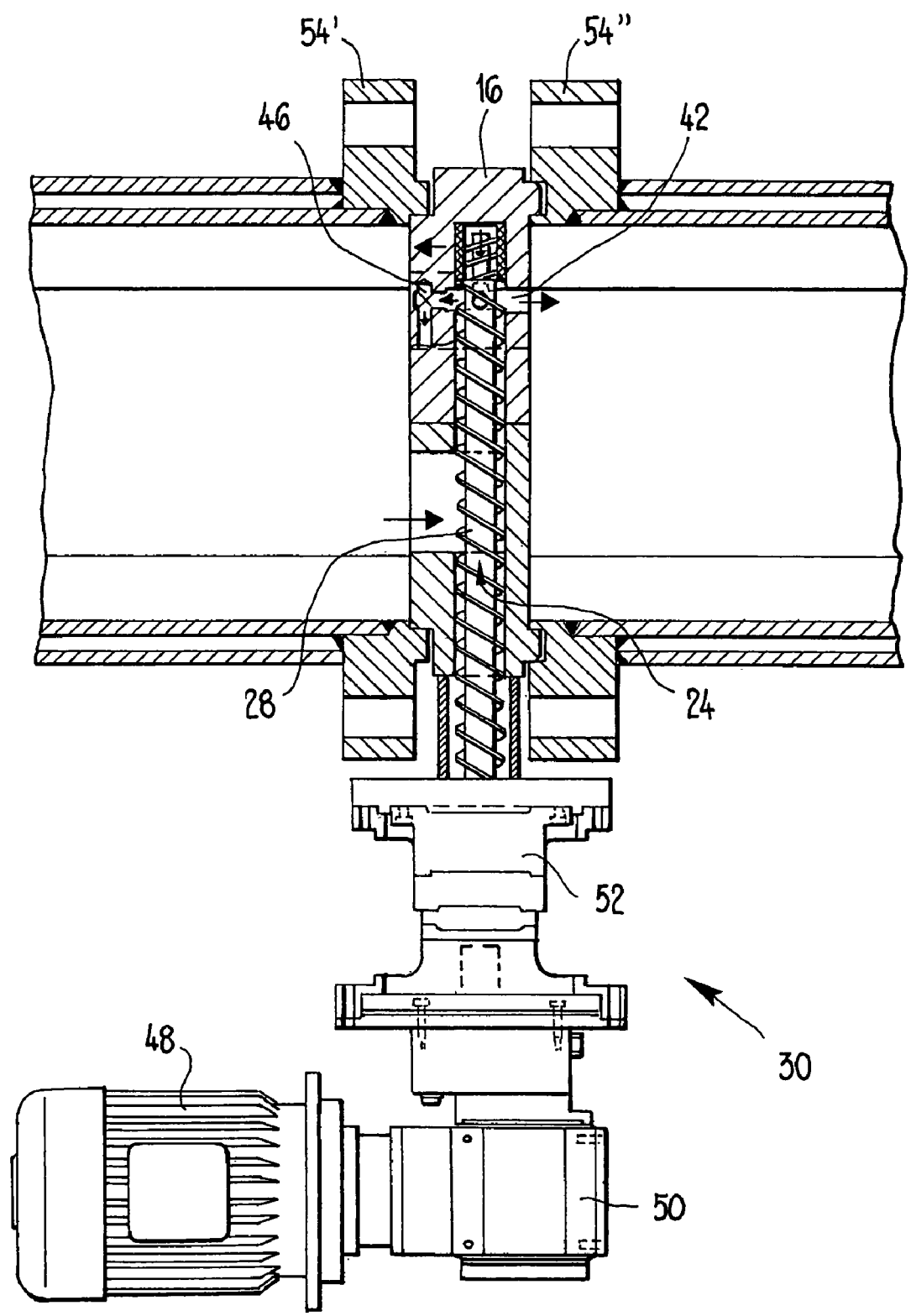
FIG. 7 shows a part of the large-volume reactor in longitudinal section on line 7—7 in FIG. 6 with a drive device additionally illustrated in side view.
Figure 8:
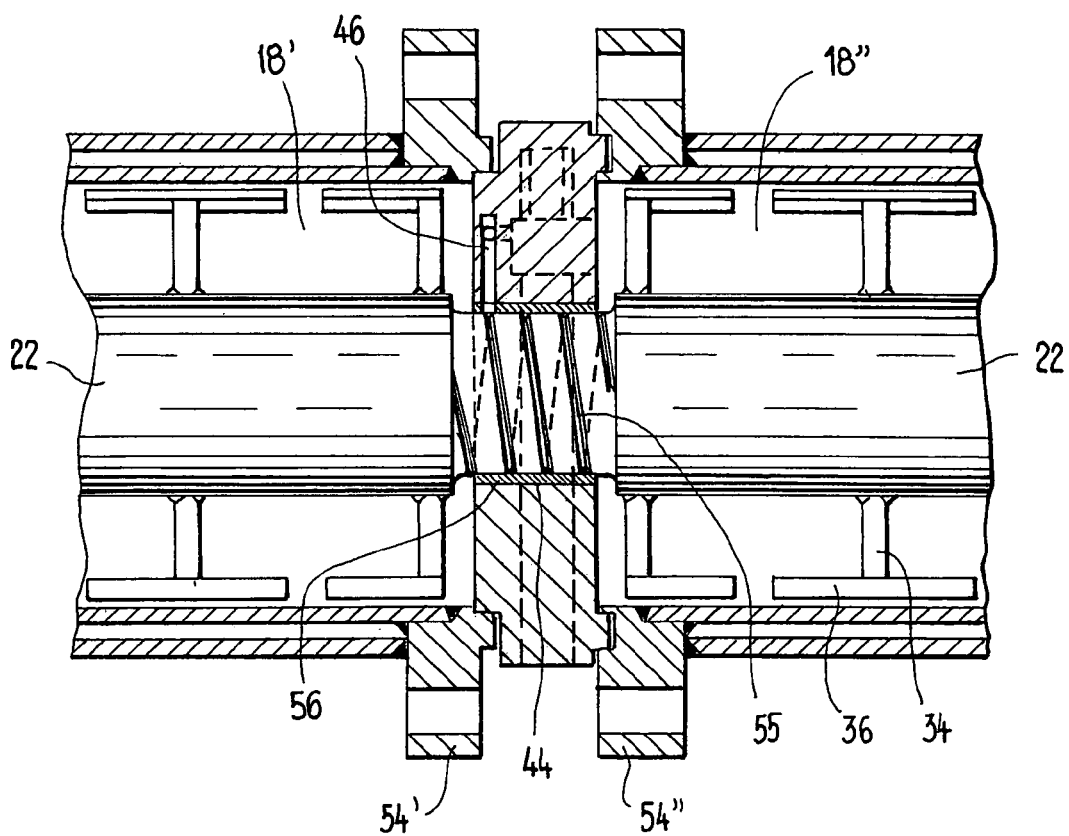
FIG. 8 shows a part of the large-volume reactor in longitudinal section on line 8—8 in FIG. 6 with a rotor shaft bearing and a seal.

FIGS. 6, 7 and 8 illustrate an embodiment in which parallel rotor shafts 22 which act in both process spaces 18', 18" pass through the partition wall 16.

As can be seen in particular from FIG. 6, in this embodiment the surface area of the inlet opening 40 of the partition wall 16 is larger than that of the outlet opening 42 in the partition wall 16. Two return passages 46 lead away from the build-up system passage 26 in the partition wall 16 at the level of the outlet opening 42. The return passages 46 each have a horizontal section and a vertical section and connect the build-up system passage 26 to in each case one of the two bearing arrangements arranged in the partition wall 16 with lead-throughs 44 for the rotor shafts 22. Material which is conveyed through the build-up system passage 26 by means of the twin-screw conveyor 28 therefore passes via the return passages 46 to the lead-throughs 44, which are thereby sealed off with material as further described below with respect to FIG. 8. For production engineering reasons, the horizontal bore of the return passages 46 leads to the outside and is sealed off using an insert 47.

As can be seen from FIG. 7, the drive system 30 of the twin-screw conveyor 28 of the build-up system 26 comprises an electric motor 48, a transmission 50 and a screw shaft seal 52. The partition wall 16, which is assigned the build-up system 24, is clamped between two annular flanges 54', 54" which are clamped together by means of tensioning screws, of the tubular part-housings, which are in the form of a figure of eight in radial section, of the single housing.

In general, the twin-screw conveyor 28 is mounted without any dead spaces in the build-up passage 26. As shown in FIG. 7, that part of the twin-screw conveyor 28 which lies above the outlet opening 42 can be mounted on a material which is resistant to abrasion and may have a pitch which is opposite to that part of the twin-screw conveyor 28 which is inside the build-up system passage 26. Any material which is located above the outlet opening 42 inside the build-up system 24 is therefore conveyed downward to the outlet opening 42.

Parts of a return passage 46, which has been described in connection with FIG. 6, are also shown.

As shown in FIG. 8, a blocking screw thread 55 for sealing off the process spaces 18', 18" is arranged in the region which passes through the partition wall 16. The blocking screw thread 55 is present on a sleeve 56, which is fixed with respect to the partition wall 16 so as to rotatably receive the shaft 22. The sleeve 56 comprises opposite end sections, in each of which a helically running groove is formed, with a pitch which is opposite to the groove of the other section. Material is passed out of the build-up system to the blocking screw thread 55 via the return passages 46 which have been described in connection with FIG. 6, and as the rotor shaft 22 rotates the blocking screw thread 55 conveys the material continuously into both the first process space 18' and the second process space 18". The material filled blocking screw thread 55 therefore serves as a sliding bearing and prevents material from being able to pass along the rotating rotor shaft 22 from one of the two process spaces 18', 18" into the other.

It is preferable for the partition wall 16 and sleeve 56 to be horizontally split at the height of the axes of the rotor shafts and with the partition wall being clamped and centered between the annular flanges 54', 54". This allows simple assembly and dismantling of the partition wall 16 with the rotor shaft 22 passing through it. It is also conceivable for the rotor shaft 22 to be formed from two parts, which can be screwed to the respective end stubs via a screw thread in the region passing through the partition wall 16.

Similarly to FIG. 5, in this embodiment disc elements 34 with cleaning elements 36 fitted to them are arranged on the rotor shaft 22.

Figure 9:
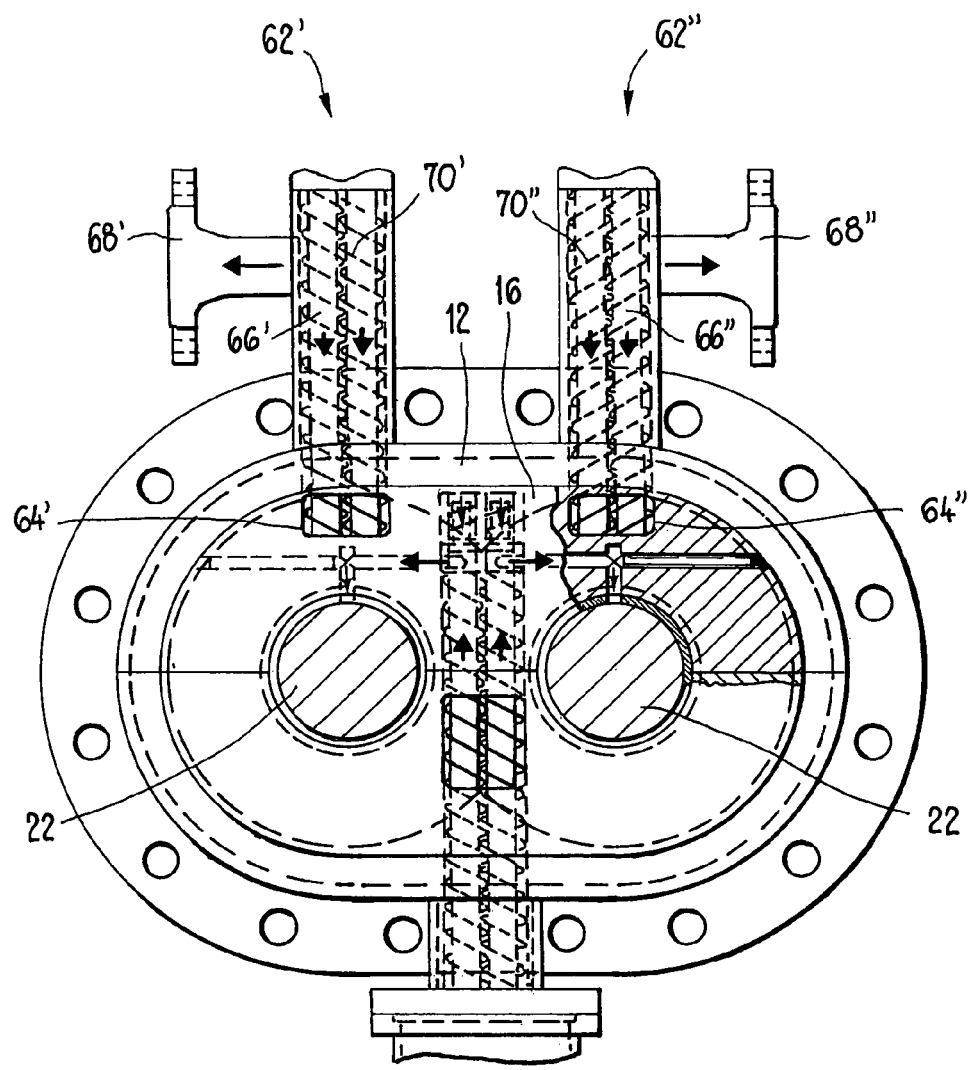
FIG. 9 shows a radial section through the partition wall of a large-volume reactor according to the invention similar to that shown in FIG. 6 and, in addition, a part of a vapor discharge system assigned to the partition wall.

The embodiment shown in FIG. 9, as an additional feature to the embodiment shown in FIGS. 6, 7 and 8, has two vapor discharge systems 62', 62", which are partially shown and are assigned to the partition wall 16. The vapor discharge systems 62', 62" each comprise a vapor inlet opening 64', 64", a vapor passage 66', 66" and a vapor outlet opening 68', 68". The vapor inlet openings 64', 64" are arranged in the upper region of the partition wall 16, adjacent to the shell of the housing 12. Furthermore, they are arranged vertically above the axes of the rotor shafts 22. Each vapor passage 66', 66" connects the vapor inlet opening 64', 64" to the vapor outlet opening 68', 68" and has a twin-screw conveyor 70', 70". The vapors are extracted through the vapor passage 66', 66", which is matched to the thickness of the partition wall 16, and if appropriate are passed via a system of pipes to a vapor condensation system, which is not shown for the sake of clarity. Material which is entrained by the vapors in the vapor passage 66', 66" is returned into the upstream process space by the twin-screw conveyor 70', 70" in the direction from the vapor outlet opening 68', 68" toward the vapor inlet opening 64', 64".

Figure 10:
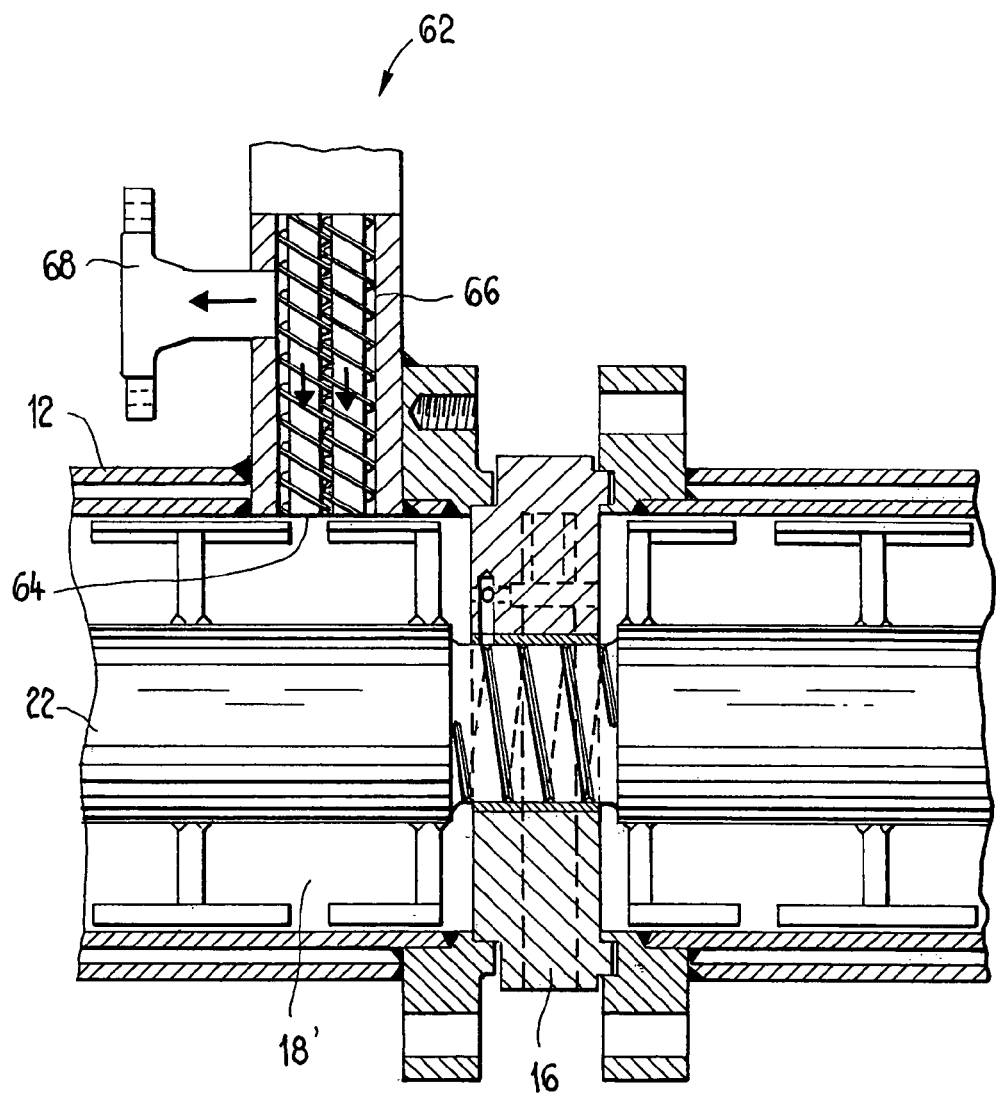
FIG. 10 shows part of a large-volume reactor similar to that shown in FIG. 8 in longitudinal section with, in addition, a vapor discharge system assigned to the first process space.

In the embodiment illustrated in FIG. 10, as an addition to the embodiment shown in FIGS. 6, 7 and 8, the first process space 18' is assigned a vapor discharge system 62. In this case, the vapor passage 66, which is matched to the volume of the first process space 18', leads through the shell of the housing 12 and connects the vapor inlet opening 64, which opens out into the first process space 18', to the vapor outlet opening 68. The vapors are extracted and the entrained material returned in a similar manner to that described in connection with FIG. 9. The inner wall of the housing 12 is cleaned in the manner described in FIG. 5. The rotor shaft 22 is mounted in the partition wall 16 in the manner described in FIG. 8.

Figure 11:
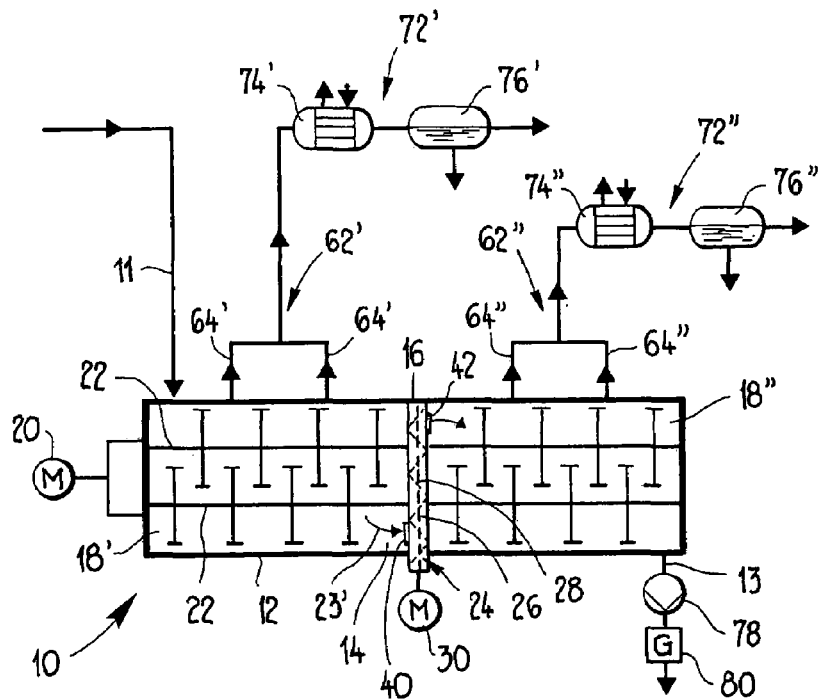
FIG. 11 shows a large-volume reactor with two parallel rotor shafts passing through the partition wall and, in addition, two vapor discharge systems, which are each assigned to one of the process spaces and each have two vapor outlet openings in the lateral wall of the housing.

The large-volume reactor 10 which is diagrammatically depicted in FIG. 11 comprises a housing 12 which surrounds an interior space 14, a material feed 11 at one end of the housing 12 and a material discharge 13 at the other end of the housing 12. In the interior space 14, a partition wall 16 separates two process spaces 18', 18" from one another.

Two parallel rotor shafts 22, which are arranged next to one another in a horizontal plane and are illustrated above one another for the sake of clarity, pass through the partition wall 16 and are mounted at the partition wall. The rotor shafts 22 are driven by means of a rotor shaft drive system 20, conveying the material which is to be treated through the two process spaces 18', 18" in the direction from the material feed 11 to the material discharge 13, where it is conveyed to a granulator 80 by means of a material discharge pump 78.

A build-up system 24 with a build-up system passage 26 is arranged in the interior of the partition wall 16. The build-up system 24 comprises a twin-screw conveyor 28 which is driven by a twin-screw conveyor drive system 30. As indicated by arrow 23', the material enters the inlet opening 40 at the build-up system 24 and is conveyed through the build-up system passage 26 with the aid of the twin-screw conveyor 28. The material passes through the outlet opening 42 into the second process space 18".

The material filling level in the first process space 18' is set in such a manner that the inlet opening 40 of the build-up system passage 26 is constantly covered with material during the process, which ensures that the passage of gas from the first process space 18' into the second process space 18" is prevented. Furthermore, it is conceivable to prevent the passage of gas from the first process space 18' into the second process space 18" with the aid of a build-up ring which is arranged in the build-up system passage 26. This allows reliable operation even if the inlet opening 40 is not completely covered with material.

The vapors are extracted from the large-volume reactor 10 by means of two vapor discharge systems 62', 62" with in each case two vapor inlet openings 64', 64". The vapor discharge systems 62', 62" are each assigned to one of the two process spaces 18', 18" and are connected to in each case one vapor condensation system 72', 72", which in each case comprises a condenser 74 and a condensate separator 76, in which the gaseous components are separated from the other components.

Figure 12:
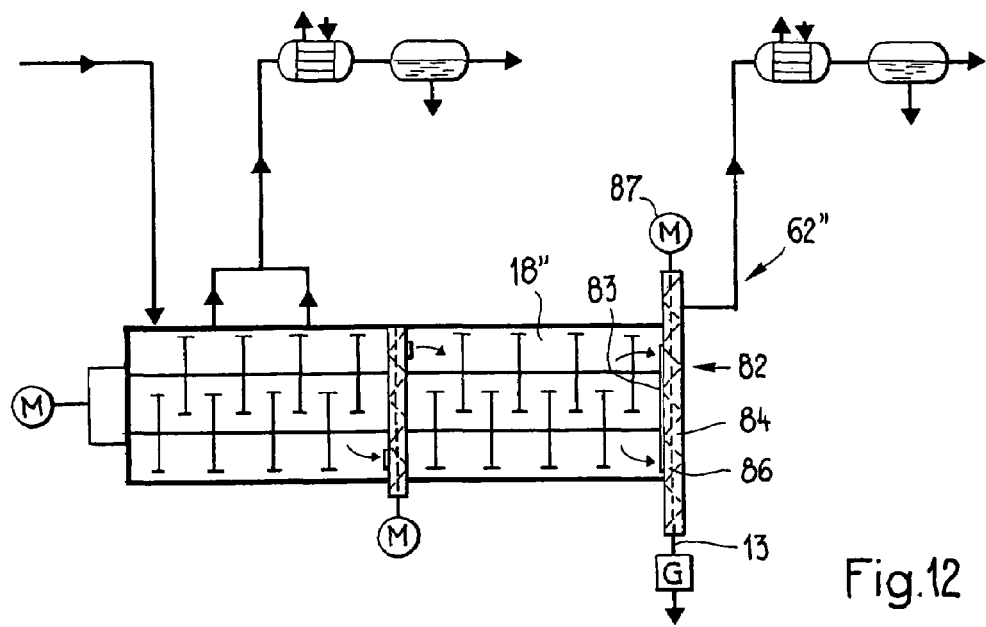
FIG. 12 shows a large-volume reactor having a material discharge system and, in addition, two vapor discharge systems, one assigned to the first process space and one to the material discharge system.

The large-volume reactor illustrated in FIG. 12, contrary to the reactor illustrated in FIG. 11, has a material discharge system 82 instead of a material discharge pump. The material discharge system 82 comprises a material discharge passage 84 which is oriented substantially at right angles to the longitudinal axis of the rotor shafts 22 and has arranged in it a twin-screw conveyor 86 which is driven by a twin-screw conveyor drive system 87. A vapor discharge system 62" is assigned to the material discharge system 82 rather than the second process space 18".

In this embodiment, the vapors produced in the second process space 18" are not extracted directly from the second process space 18", but rather, like the material, pass via a corresponding inlet opening 83, which extends approximately over the entire height of the second process space 18", into the material discharge passage 84 having the twin-screw conveyor 86.

The twin-screw conveyor 86 conveys the material downward to the material discharge 13, whereas the vapors escape upward and are extracted via the vapor discharge system 62" assigned to the material discharge system 82. Material entrained by the vapors is likewise passed downward to the material discharge 13 by the twin-screw conveyor 82.

Figure 13:
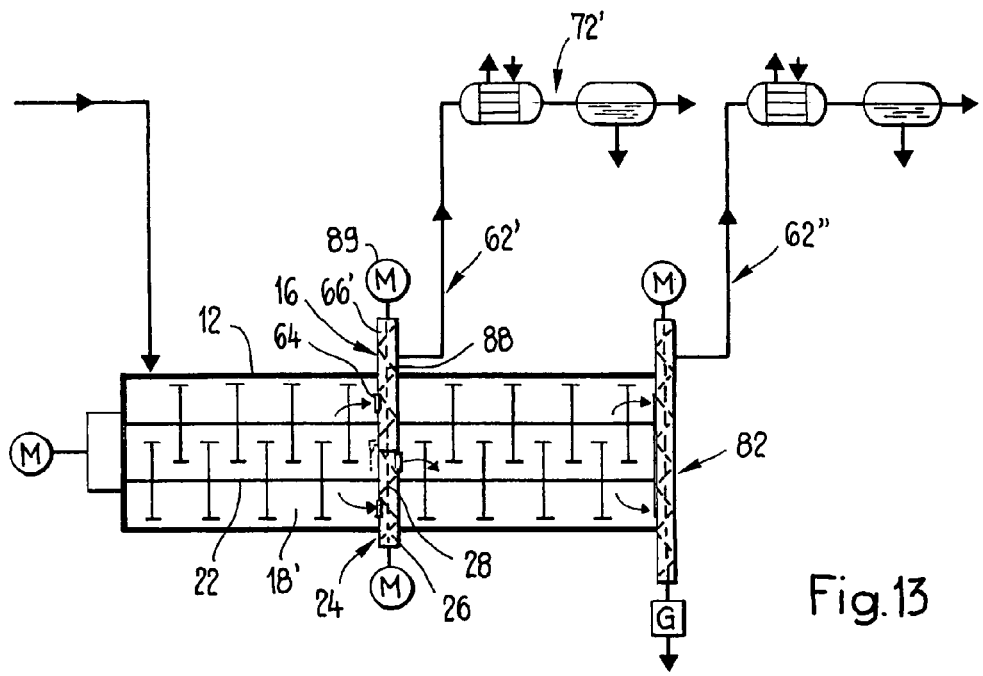
FIG. 13 shows a large-volume reactor having a material discharge system similar to that shown in FIG. 12 and, in addition, two vapor discharge systems, one assigned to the build-up system and one to the material discharge system.

Unlike in FIG. 11, in the large-volume reactor illustrated in FIG. 13 the two vapor discharge systems 62', 62" are assigned to the build-up system 24 and the material discharge system 82 instead of to the process spaces 18', 18".

In this embodiment, the vapors produced in the first process space 18' are not extracted from the first process space 18' through the wall of the housing 12, but rather pass via a vapor inlet opening 64 in the partition wall 16 into a separate vapor passage 66' which is arranged partially in the partition wall 16. That part of the vapor passage 66' which is arranged in the partition wall 16 runs in a plane which is substantially at right angles to the longitudinal axis of the rotor shafts 22 and comprises a twin-screw conveyor 88 which is driven by a dedicated drive system 89. The twin-screw conveyor 88 conveys any material entrained by the vapors in the opposite direction to the conveying direction of the build-up system 24. The vapors produced in the first process space 18' are therefore fed via the vapor passage 66' to a vapor condensation system 72', entrained material being returned to the first process space 18' by the twin-screw conveyor 88 in the vapor passage 66'. On account of the fact that the twin-screw conveyor 28 in the build-up system passage 26 and the twin-screw conveyor 88 in the vapor passage 66' are each driven by their own drive system, they can be operated independently of one another.

Figure 14:
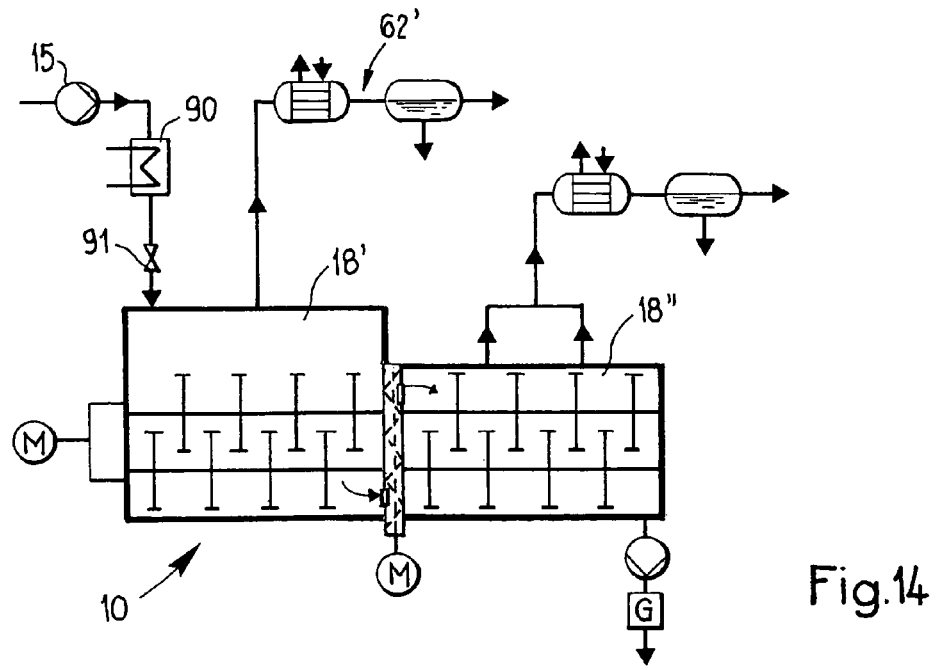
FIG. 14 shows a large-volume reactor having a first process space, which has a larger volume than the second process space, and, in addition, a vapor discharge system similar to that shown in FIG. 11 and a preheating arrangement.

FIG. 14 shows an embodiment which is similar to that shown in FIG. 11, but as an additional feature the material is pumped into a preheater 90 by means of a pump 15, heated under admission pressure and fed into the first process space 18', in which a lower pressure prevails, via a valve 91, before being fed to the large-volume reactor 10. On account of the rapid pressure drop, spontaneous expansion evaporation produces a large volume of vapors, which is extracted by means of the vapor discharge system 62' assigned to the first process space 18'. Therefore, the first process space 18' has a larger volume than the second process space 18". The relatively large volume of the first process space 18' allows relatively large quantities of vapors to be produced with reduced flow pressure losses and less material entrained by the vapors.

Figure 15:
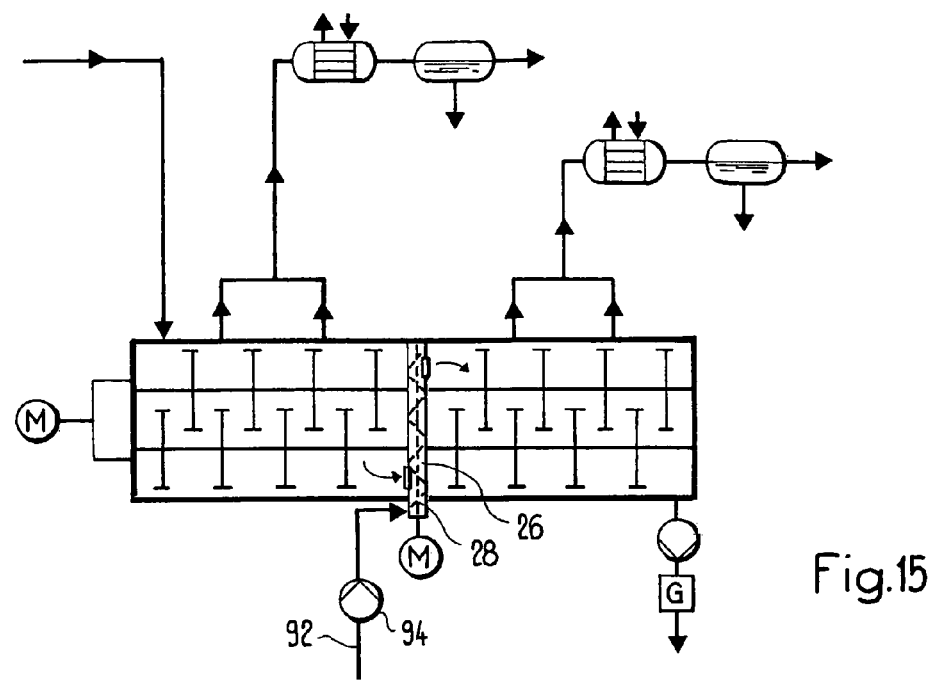
FIG. 15 shows a large-volume reactor with, in addition, a vapor discharge system similar to that shown in FIG. 11 and a feed passage leading to the build-up system passage.

FIG. 15 shows an embodiment which is similar to that shown in FIG. 11 and in which in addition a feed passage 92 for supplying a substance leads into the build-up system passage 26. A further component, such as for example a catalyst, a regulator, a stopper, a neutralizer or a stripping medium, is added to the material in the build-up passage 26 by means of a metering pump 94, is mixed in homogenously by the twin-screw conveyor 28 and is then fed to the second process space 18".

Figure 16:
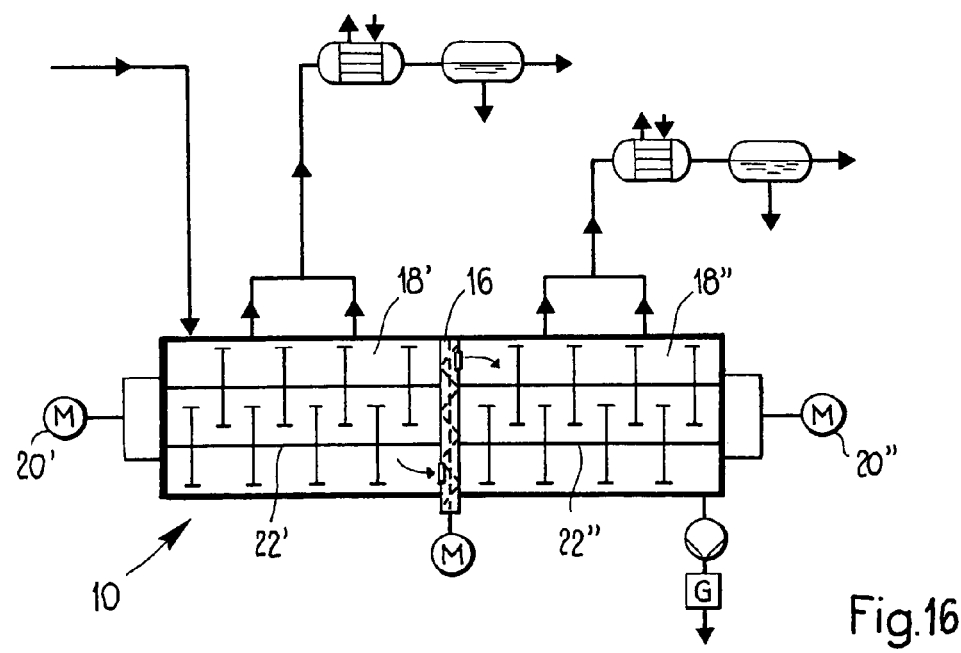
FIG. 16 shows a large-volume reactor with two parallel rotor shafts arranged in the first process space, two further parallel rotor shafts arranged in the second process space and, in addition, a vapor discharge system similar to that shown in FIG. 11.

Unlike in the embodiment shown in FIG. 11, in the large-volume reactor 10 shown in FIG. 16 two parallel rotor shafts 22' are arranged in the first process space 18' and two further parallel rotor shafts 22" are arranged in the second process space 18', and are mounted at the partition wall 16. The rotor shafts 22' in the first process space 18' and the rotor shafts 22" in the second process space 18" are driven by in each case one dedicated drive system 20', 20". The rotational speed and direction of rotation of the two parallel rotor shafts 22' in the first process space 18' can differ from the rotor shafts 22" in the second process space 18". Moreover, it is conceivable for the configuration of the parallel rotor shafts 22' and the distance between them in the first process space 18' to differ from those of the rotor shafts 22" in the second process space 18". This allows the characteristics of the rotor shafts to be optimally matched to the material composition and the process step in the corresponding process space.

Figure 17:
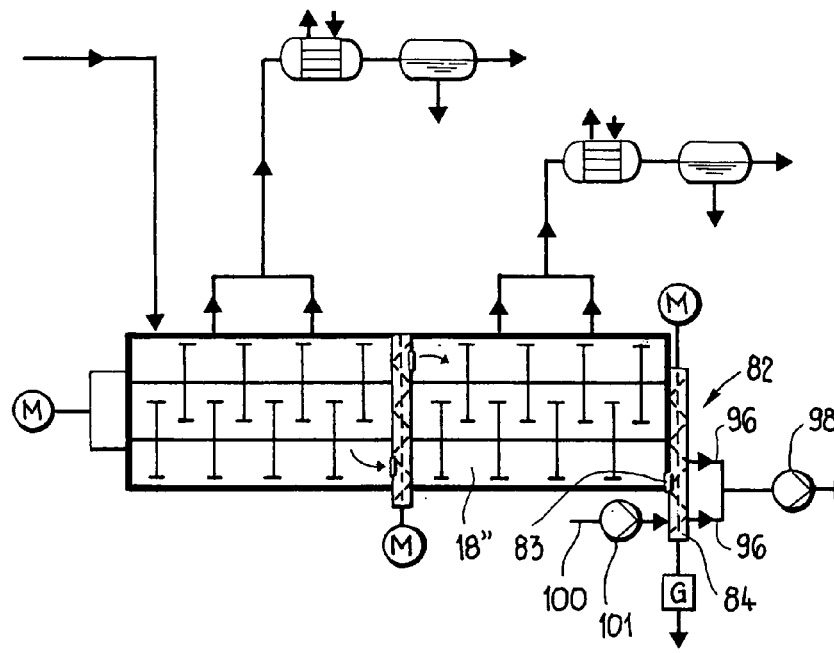
FIG. 17 shows a large-volume reactor having a material discharge system, and in addition a feed passage which leads to the material discharge passage, two degassing passages which lead away from the material discharge passage and two vapor discharge systems similar to FIG. 11.

FIG. 17 shows an embodiment which is similar to FIG. 11 and in which in addition residual volatile constituents are extracted in a material discharge system 82 via two residual devolatilizing openings 96 in the material discharge passage 84 with the aid of a vacuum pump 98. Additional components, such as for example a stripping agent, can be added by means of a metering pump 101 via a feed passage 100 which opens out into the material discharge passage 84. In this embodiment, the inlet opening 83 of the material discharge passage 84 is arranged adjacent to the base of the second process space 18".

Figure 18:
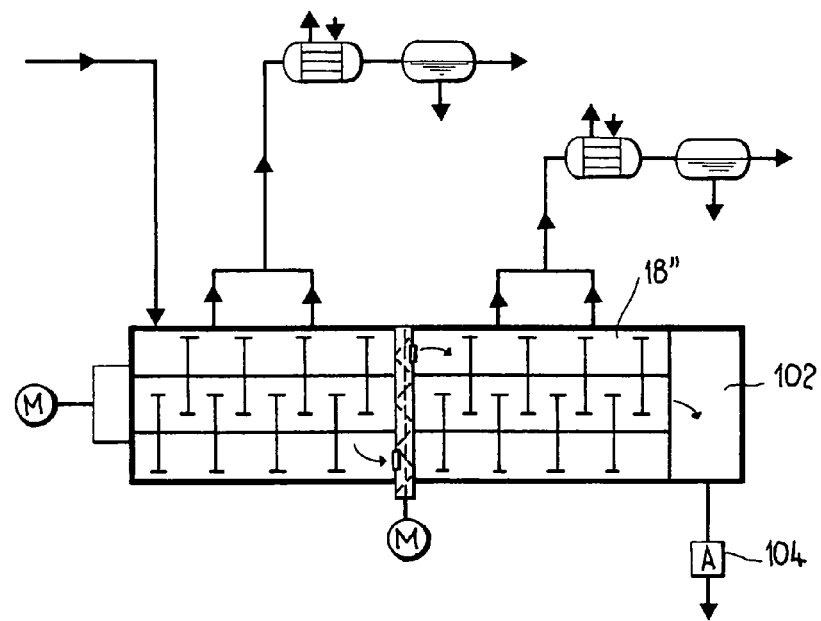
FIG. 18 shows a large-volume reactor having, in addition, two vapor discharge systems similar to FIG. 11 and a powder discharge.

FIG. 18 shows a large-volume reactor similar to that shown in FIG. 11 with, in addition, a powder discharge space 102 arranged after the second process space 18". This powder discharge space 102 is assigned a closure member 104, which forms a vacuum or excess pressure seal, for the discharge of solids, such as for example a star feeder, a plunger lock, a flat slide or flaps. A large-volume reactor of this type is advantageous for processes in which the material to be treated passes through a phase change from a free-flowing molten material to a trickling powder or granules.

The powder discharge space 102 can have a vertically adjustable central weir or side weir for the purpose of adjusting the filling level. The closure member 104 prevents pressure compensation between the powder discharge space 102 and the environment.

Figure 19:
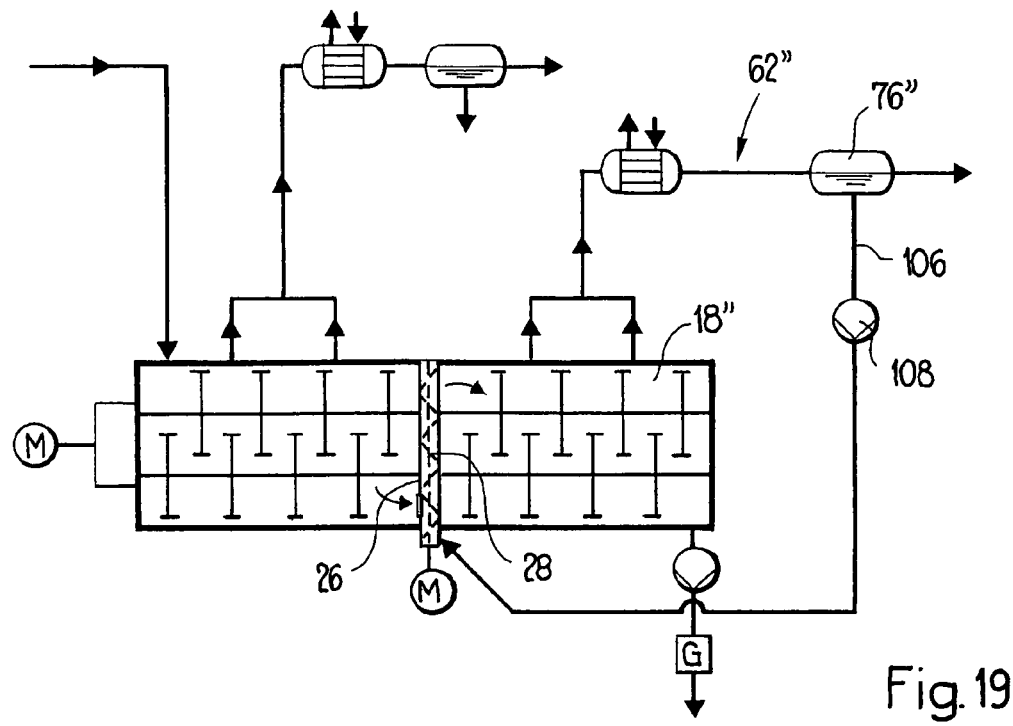
FIG. 19 shows a large-volume reactor having, in addition, two vapor discharge systems similar to FIG. 11 and a feed passage leading to the build-up system passage for supplying the condensate from a vapor condensation system assigned to the second process space.

In the embodiment illustrated in FIG. 19, as an additional feature to, the embodiment shown in FIG. 11, a condensate passage 106, which leads into the build-up system passage 26, leads out of the condensate separator 76" of the vapor discharge system 62" assigned to the second process space 18". In this case, the condensate is added to the material in the build-up system passage 26 by means of a metering pump 108 assigned to the condensate passage 106, is mixed in homogenously by the twin-screw conveyor 28 and is then passed to the second process space 18". Alternatively, the condensate can also be metered directly into the second process space 18" at one or more locations. The temperature of the material is controlled by evaporative cooling as a result of the condensate being passed into the second process space 18".

Figure 20:
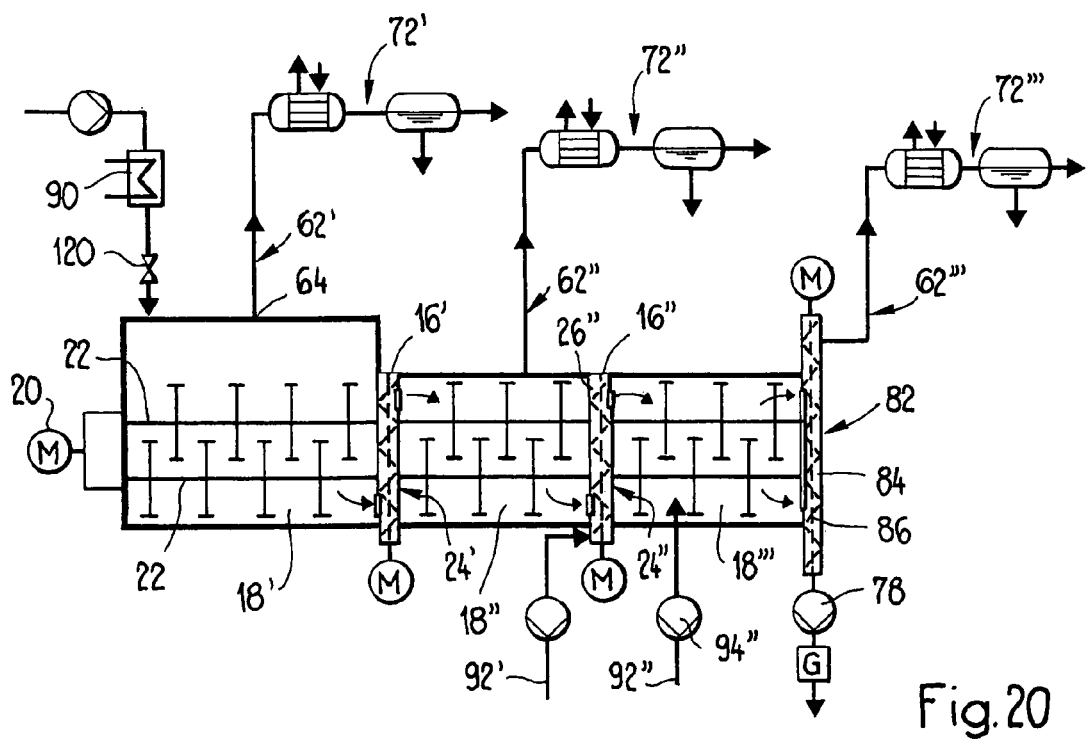
FIG. 20 shows a large-volume reactor having three discharge systems for concentration and residual devolatilization of a polymer solution.

FIG. 20 shows an embodiment with three process spaces 18', 18", 18''', which are separated by two partition walls 16', 16" each with a build-up system 24', 24" arranged therein. As in FIG. 11, the first two process spaces 18', 18" are each assigned a vapor discharge system 62', 62", and as in FIG. 12 a vapor discharge system 62''' is assigned to the material discharge system 82. In addition, a feed passage 92' leads to the second build-up system passage 26', in a similar way to that described in FIG. 15. A further feed passage 92" leads into the third process space 18'''. As in FIG. 14, the large-volume reactor has a first process space 18', which has a larger volume than the other process spaces 18", 18''' and in addition a preheater 90, downstream of which there is a flash valve 120. Concentration of a polymer which is carried out in this large-volume reactor is described in detail below.

Figure 21:
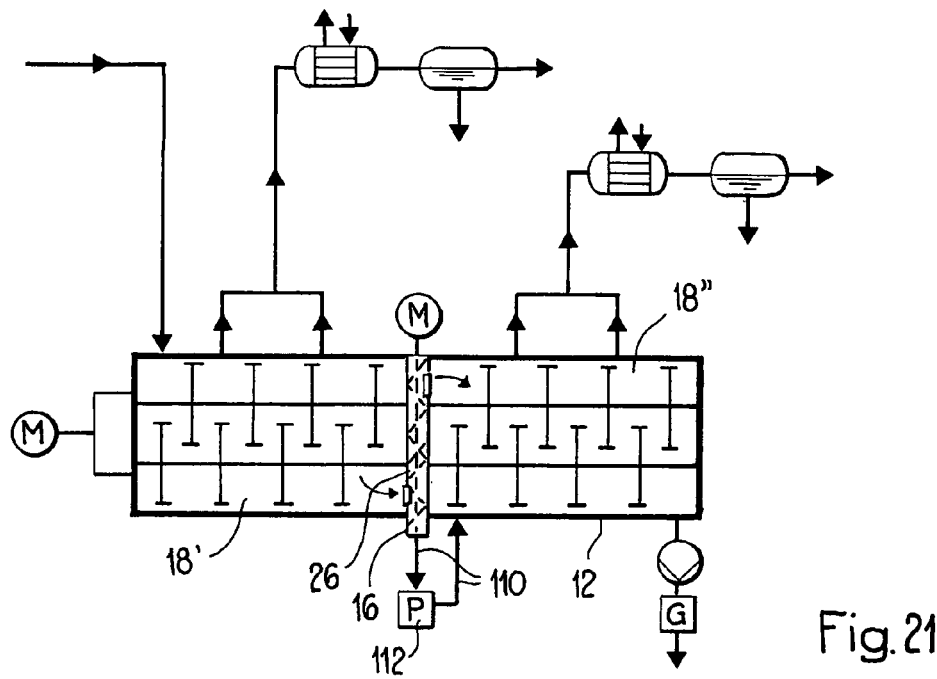
FIG. 21 shows a large-volume reactor having, in addition, two vapor discharge systems similar to FIG. 11 and a partial-stream passage, leading away from the build-up system passage, for removing samples and returning them to the second process space.

FIG. 21 shows an embodiment which is analogous to that shown in FIG. 11 but in which as an additional feature a partial-stream passage 110 branches off from the build-up system passage 26 and, passing through the wall of the housing 12 in a region adjacent to the partition wall 16, opens out into the second process space 18". Therefore, some of the material from the first process space 18' is passed into the second process space 18" by the build-up system passage 26, and the remainder of the material is passed into the second process space 18" via the partial-stream passage 110. In this case, the partial-stream passage 110 is assigned a device 112 for process value monitoring or for process value control. The process value may, for example, be monitored by means of the determination of the product viscosity, the product density or the color number. The control of the process value is effected, for example, by adjusting the pressure, the temperature or the reaction progress in the first process space 18'.

Figure 22:
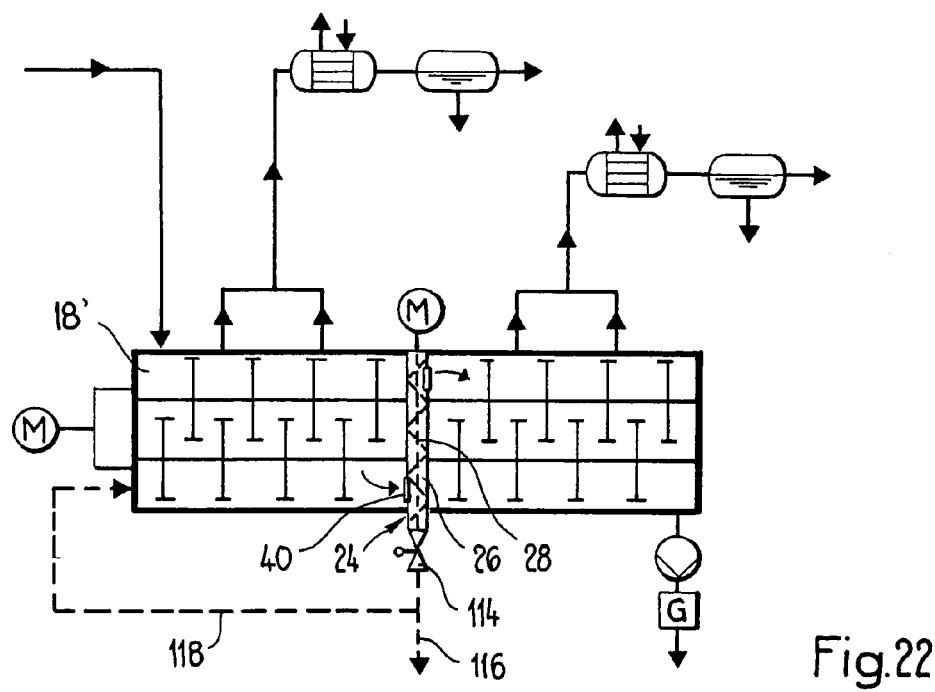
FIG. 22 shows a large-volume reactor having, in addition, two vapor discharge systems similar to FIG. 11 and a valve for removing material from the build-up system passage, which is then disposed of or returned to the first process space.

In the embodiment shown in FIG. 22, as an additional feature to the embodiment shown in FIG. 11, the build-up system 24 is assigned a shut-off or control valve 114. If the direction of rotation of the screw conveyor 28 in the build-up system passage 26 is reversed, the material is passed from the inlet opening 40 of the build-up system passage 26 via the shut-off or control valve 114 into an emptying passage 116, from which, when desired, the emptied material can be fed back to the first process space 18' via a recirculation passage 118.

The concentration and residual degasification of a styrene-butadiene-styrene polymer is described in detail on the basis of the large-volume reactor with three process spaces 18', 18", 18''' shown in FIG. 20.

A styrene-butadiene-styrene polymer with a solvent concentration of 65 to 80% by weight is heated to a temperature of 150 to 1900° C. in the preheater 90. The polymer is fed via the flash valve 120 into the first process space 18' at a temperature of 150 to 190° C. and an absolute pressure of 150 to 400 kPa. When the superheated polymer solution enters the first process space 18', spontaneous expansion evaporation occurs, in which a large proportion of the solvent which is to be separated off or of the volatile components is converted into the vapor phase. The first process space 18' has a larger volume than the further process spaces 18", which enables the large quantities of vapors produced to be extracted without disruption. The first process space 18' is assigned the vapor discharge system 62' with a vapor inlet opening 64 at the housing 12, through which the vapors are extracted and fed to a first vapor condensation system 72'.

The pre-concentrated material with a solvent concentration of 5 to 20% by weight and a temperature of 120 to 160° C. is passed out of the first process space 18' into the second process space 18", with a temperature of 140 to 180° C. and a pressure of 10 to 40 kPa, through the first build-up system 24', during which process expansion evaporation again occurs, and the vapors which are thereby produced are extracted in a similar manner to that described in connection with the first process space 18' and are fed to a second vapor condensation system 72".

The concentrated material with a solvent concentration of 0.1 to 5% by weight and a temperature of 140 to 180° C. is passed from the second process space 18" into the third process space 18''', with a temperature of 140 to 190° C. and a pressure of 0.5 to 2 kPa, through the second build-up system 24", with expansion evaporation again occurring. This is assisted by a stripping medium, such as for example water, steam or nitrogen, which has been added to the material in the build-up system passage 26' and mixed in homogenously by means of a metering pump 94'. The vapors produced are extracted via the vapor discharge system 62''' assigned to the material discharge system 82 and are fed to a third vapor condensation system 72'''. This residual devolatilization can be assisted by further mixing of stripping medium into the third process space 18''' via the feed passage 92" by means of a metering pump 94". The material which has undergone residual devolatilization and has a solvent concentration of 100 to 2000 ppm and a temperature of 140 to 180° C. is discharged from the third process space 18''' via a material discharge passage 84 with a twin screw 86 arranged therein and is fed to a material discharge pump 78 designed as a gear pump, which builds up the pressure required for the subsequent pelletization in the pelletizer 80.

The rotor shafts 22 which are driven by the drive system 20 and convey the material in the direction from the material feed 11 to the material discharge 13 can rotate in the same direction or in opposite directions. The kinematics, the geometry, the direction of rotation and the temperature control of the rotor shafts 22 may differ in the individual process spaces 18', 18", 18''' according to process requirements.

The supply of heat in the individual process spaces 18', 18", 18''' which is required for the evaporation can be effected by heat conduction via the walls of the housing 12 or via the rotor shafts 22 and by means of the dissipation which occurs during viscous shearing.

Figure 23:
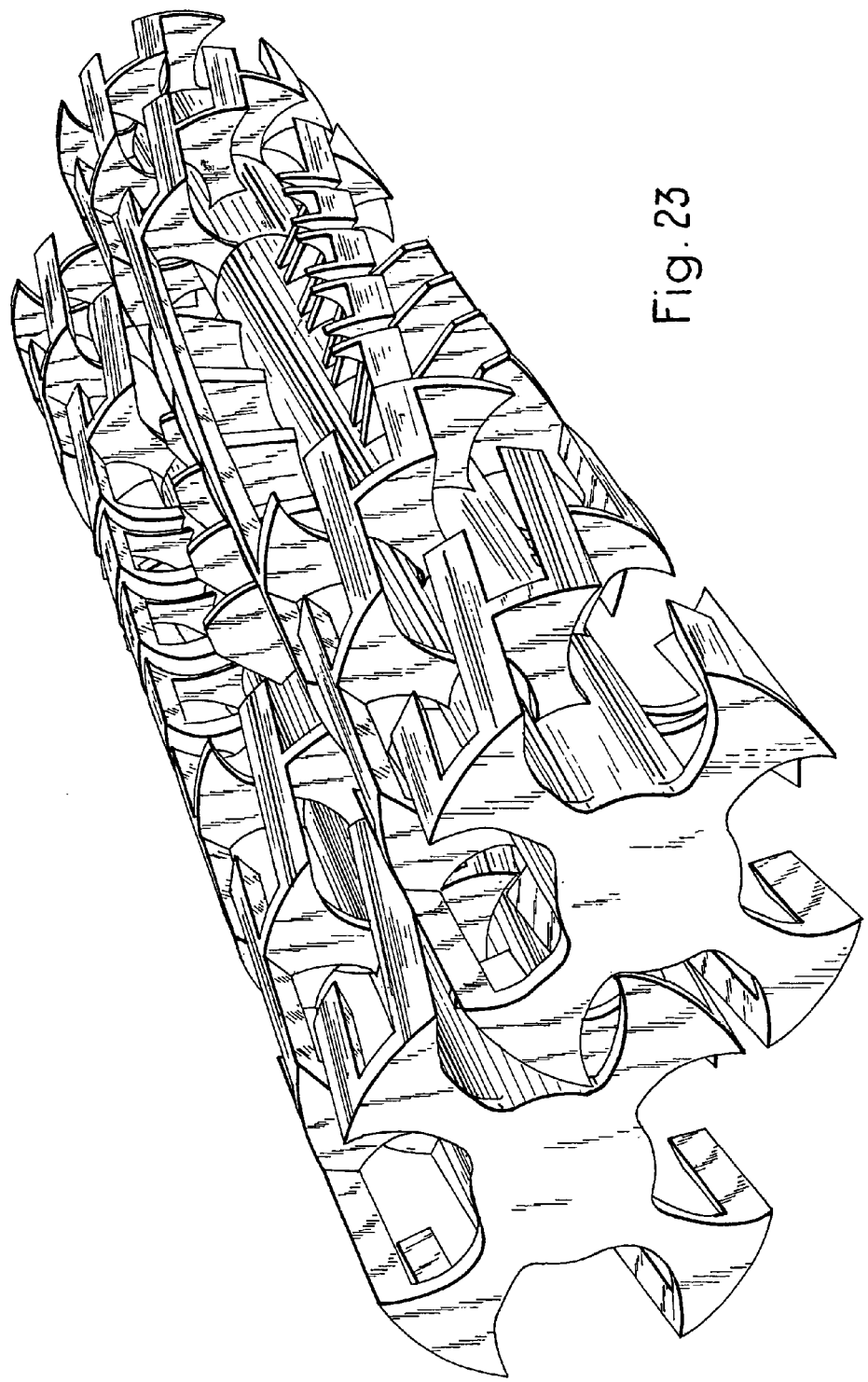
FIG. 23 shows a perspective view of a rotor shaft, the end regions of which have a configuration which differs from that of the central region.

The rotor shafts 22 illustrated in the above figures may be of any desired design. Conceivable examples include combinations of the rotor shaft disclosed in EP-A-1101525 and the rotor shaft disclosed in EP-B-715881. Therefore, FIG. 23 shows a perspective view of a rotor shaft which in its end regions is designed in accordance with EP-B-715881 and in its central region is designed in accordance with EP-A-1101525.

The invention claimed is:

1. A large-volume reactor for treating free-flowing material, comprising
   a housing surrounding an interior space, said housing including a material feed at one end and a material discharge at the other end,
   a rotor shaft arranged in the interior space for rotation about its axis so as to convey the material in a direction from the material feed to the material discharge,
   a partition wall mounted in the interior space so as to define two process spaces which are separated from one another, the partition wall including a build-up system having a build-up system passage which leads from an inlet opening which opens out into a first process space, to an outlet opening which opens out into a second process space, and comprising an active conveyor for conveying the material through the build-up system passage and with the build-up system passage being configured to pass the material from the first process space into the second process space while substantially preventing gas from entering into the passage and passing through the passage and thus between the first and second process spaces.

2. The large-volume reactor as claimed in claim 1, wherein the active conveyor is a intermeshing twin screw conveyor.

3. The large-volume reactor as claimed in claim 1, wherein the active conveyor is driven in such a manner that its rotational speed can be varied.

4. The large-volume reactor as claimed in claim 1, wherein the build-up system is arranged in the partition wall and is disposed in a plane which is at least approximately at right angles to the longitudinal axis of the rotor shaft, and wherein the inlet opening is arranged adjacent to the base of the first process space and the outlet opening is arranged at a higher level with respect to the inlet opening.

5. The large-volume reactor as claimed in claim 1, wherein the rotor shaft extends through the partition wall and into the two process spaces, and with the rotor shaft being mounted so as to be sealed at the partition wall.

6. The large-volume reactor as claimed in claim 1, wherein two parallel rotor shafts are arranged in at least one of the two process spaces.

7. The large-volume reactor as claimed in claim 6, wherein the two parallel rotor shafts extend through the partition wall, are mounted so as to be sealed at the partition wall, with each shaft extending into the two process spaces.

8. The large-volume reactor as claimed in claim 1, wherein a first rotor shaft is arranged in the first process space and is mounted at the partition wall, a second rotor shaft is arranged in the second process space and is mounted at the partition wall, and both rotor shafts are driven individually.

9. The large-volume reactor as claimed in claim 8, wherein the two parallel rotor shafts are arranged in one process space and are mounted at the partition wall.

10. The large-volume reactor as claimed in claim 1, wherein the build-up system is heated.

11. The large-volume reactor as claimed in claim 1, wherein a partial stream passage for the removal of material leads away from the build-up system passage.

12. The large-volume reactor as claimed in claim 1, wherein a feed passage for supplying a substance leads into the build-up system passage.

13. The large-volume reactor as claimed in claim 1, further comprising a vapor discharge system which includes a vapor passage, the vapor passage comprising a vapor inlet opening which opens out into the first process space at an upper region of the partition wall, and a vapor outlet opening which is connected to an external vapor condensation system, and the vapor passage is configured to pass vapors from the first process space to the vapor condensation system.

14. The large-volume reactor as claimed in claim 1, wherein the first process space has a larger volume than the second process space.

15. The large-volume reactor as claimed in claim 1, wherein at least one process space has a vapor inlet opening in a side wall of the housing.

16. The large-volume reactor as claimed in claim 1, wherein the surface of the partition wall is of planar design and is arranged perpendicular to the longitudinal axis of the rotor shaft, and the rotor shaft mounts a cleaning element which interacts with the partition wall for cleaning purposes.

17. A method for treating a free flowing material comprising the steps of
providing a large-volume reactor which comprises a housing surrounding an interior space, a material feed at one end of the housing, a material discharge at the other end of the housing, a rotor shaft arranged in the interior space for rotation about its axis so as to convey the material in a direction from the material feed to the material discharge, and a partition wall mounted in the interior space so as to define two process spaces which are separated from one another, the partition wall including a build-up system having a build-up system passage which leads from an inlet opening which opens out into a first process space adjacent the base of the first process space, to an outlet opening which opens out into a second process space at a higher level with respect to the inlet opening, and feeding the free flowing material from the material feed toward the material discharge by rotation of the rotor shaft, while causing the material to pass through the build-up system passage, and so that the material covers the inlet opening so as to substantially prevent the passage of gas through the build-up system passage.

18. The method as claimed in claim 17 wherein the first and second process spaces are maintained at different pressures.

19. The method as claimed in claim 17 wherein the material is actively conveyed through the build-up system passage by means of a screw conveyor.

20. The method as claimed in claim 17 comprising the further step of venting vapor from at least one of the first and second process spaces.

21. The method as claimed in claim 17 wherein the free flowing material comprises a polymer.

* * * * *

UNITED STATES PATENT AND TRADEMARK OFFICE
CERTIFICATE OF CORRECTION

PATENT NO. : 7,083,319 B2  
APPLICATION NO. : 10/738677  
DATED : August 1, 2006  
INVENTOR(S) : Peters et al.

Page 1 of 1

It is certified that error appears in the above-identified patent and that said Letters Patent is hereby corrected as shown below:

<u>Column 13,</u>  
Line 3, "1900° C" should read --190° C--.

Signed and Sealed this

Sixteenth Day of January, 2007

JON W. DUDAS  
*Director of the United States Patent and Trademark Office*